United States Patent [19]
McConnell et al.

[11] Patent Number: 6,050,593
[45] Date of Patent: Apr. 18, 2000

[54] PERSONAL MOBILITY VEHICLE

[75] Inventors: Chris McConnell, Mt. Top; Fred Kiwak, Falls; Chad Morgan, W. Pittston, all of Pa.

[73] Assignee: Golden Technologies, Inc., Old Forge, Pa.

[21] Appl. No.: 08/923,769

[22] Filed: Sep. 2, 1997

Related U.S. Application Data

[60] Provisional application No. 60/045,144, Apr. 30, 1997.

[51] Int. Cl.$^7$ .......................................................... B62J 1/00
[52] U.S. Cl. ........................................... 280/657; 280/287
[58] Field of Search ...................................... 280/657, 287

[56] References Cited

U.S. PATENT DOCUMENTS

| | | | |
|---|---|---|---|
| D. 178,841 | 9/1956 | Kummer | D40/1 |
| D. 269,960 | 8/1983 | Cosper | D12/85 |
| 1,046,681 | 12/1912 | Towson . | |
| 1,333,121 | 3/1920 | LaRoche . | |
| 1,348,568 | 8/1920 | Kemble . | |
| 1,984,831 | 12/1934 | Highley | 180/17 |
| 2,448,992 | 9/1948 | Love et al. | 180/23 |
| 2,495,573 | 1/1950 | Duke | 180/15 |
| 2,574,199 | 11/1951 | Tandler et al. | 180/25 |
| 2,594,034 | 4/1952 | King | 180/33 |
| 2,696,272 | 12/1954 | Schlaphoff | 180/33 |
| 2,749,997 | 6/1956 | Deslippe | 180/25 |
| 2,817,406 | 12/1957 | Brewer | 180/11 |
| 2,819,093 | 1/1958 | Geiser | 280/112 |
| 2,839,146 | 6/1958 | Bouffort | 180/33 |
| 2,867,449 | 1/1959 | Shawver | 280/47.18 |
| 2,910,130 | 10/1959 | Schlaphoff | 180/33 |
| 2,919,758 | 1/1960 | Newton et al. | 180/25 |
| 2,973,048 | 2/1961 | Jensen | 180/27 |
| 2,993,550 | 7/1961 | Klappert | 180/15 |
| 3,001,599 | 9/1961 | Fryar | 180/33 |
| 3,004,619 | 10/1961 | Straussler | 180/27 |
| 3,043,389 | 7/1962 | Steinberg | 180/27 |
| 3,057,425 | 10/1962 | Proett | 180/27 |
| 3,108,481 | 10/1963 | Westmont | 74/220 |
| 3,117,648 | 1/1964 | Landreth | 180/55 |

(List continued on next page.)

OTHER PUBLICATIONS

Amigo Selection Guide, Amigo Mobility International, Inc.
Ranger Solo, Advertisement, Ranger All Season Corporation.
Tri–Rolls Rear Wheel Drive Powered Scooter, Advertisement, Invacare Corp.
The 2000 Family, Advertiement, Fortress Scientific.
Chauffeur, Advertisement, Dignified Products Corp.
California Comfort, Advertisement, A Product of Jubilee Scooters, Inc.
Carrette, Advertisement, Everest Jennings.
The Coyote, Advertisement, Harwill Mobility.
The Condor, Advertisement, Unicare Medical Products.
Pace Saver + Plus II, Advertisement, Harwill Mobility.
Discover the difference Sierra can make in your life, Advertisement, Orhto–Kinetics, Inc.
I Get Around, Advertisement, A–BEC Mobility Inc.

*Primary Examiner*—Kenneth R. Rice
*Attorney, Agent, or Firm*—Volpe and Koenig, P.C.

[57] ABSTRACT

A personal mobility vehicle having front and rear chassis members interconnected by a locking means. The rear chassis member includes alignment means for aligning the rear chassis with a suspension assembly of the front chassis. An adjustable seat assembly supports a user while preventing accidental disengagement of the locking means.

6 Claims, 16 Drawing Sheets

U.S. PATENT DOCUMENTS

| | | | |
|---|---|---|---|
| 3,177,962 | 4/1965 | Bailey | 180/11 |
| 3,190,676 | 6/1965 | Junge | 280/273 |
| 3,202,234 | 8/1965 | Osborne | 180/65 |
| 3,212,596 | 10/1965 | Johnson | 180/26 |
| 3,213,957 | 10/1965 | Wrigley | 180/26 |
| 3,249,171 | 5/1966 | Kinghorn | 180/27 |
| 3,254,734 | 6/1966 | Behrmann | 180/19 |
| 3,282,365 | 11/1966 | McReynolds | 180/27 |
| 3,329,228 | 7/1967 | Harris | 180/27 |
| 3,369,629 | 2/1968 | Weiss | 180/27 |
| 3,388,761 | 6/1968 | Arpin | 180/27 |
| 3,486,765 | 12/1969 | Turner | 280/278 |
| 3,504,934 | 4/1970 | Wallis | 280/282 |
| 3,513,926 | 5/1970 | Paget, Jr. | 180/32 |
| 3,580,349 | 5/1971 | Brennan | 180/27 |
| 3,605,929 | 9/1971 | Rolland | 180/26 |
| 3,698,502 | 10/1972 | Patin | 180/27 |
| 3,713,502 | 1/1973 | Delaney et al. | 180/27 |
| 3,749,192 | 7/1973 | Karchak, Jr. et al. | 180/6.5 |
| 3,770,289 | 11/1973 | Dougherty et al. | 280/36 |
| 3,781,031 | 12/1973 | Patin | 280/62 |
| 3,871,464 | 3/1975 | Eden | 180/19 S |
| 3,896,891 | 7/1975 | Miltenburg et al. | 180/6.5 |
| 3,921,744 | 11/1975 | Benoit et al. | 180/13 |
| 3,924,706 | 12/1975 | Figura | 180/89 A |
| 3,931,989 | 1/1976 | Nagamitsu | 280/283 |
| 3,941,198 | 3/1976 | Kappas | 180/11 |
| 3,945,449 | 3/1976 | Ostrow | 180/6.5 |
| 4,006,916 | 2/1977 | Patin | 280/282 |
| 4,037,678 | 7/1977 | Braune | 180/11 |
| 4,111,274 | 9/1978 | King et al. | 180/25 R |
| 4,119,163 | 10/1978 | Ball | 180/6.5 |
| 4,340,124 | 7/1982 | Leonard | 180/208 |
| 4,423,400 | 12/1983 | Marcoz | 337/72 |
| 4,452,327 | 6/1984 | Mowat et al. | 180/11 |
| 4,469,188 | 9/1984 | Mita | 180/215 |
| 4,503,925 | 3/1985 | Palmer et al. | 180/13 |
| 4,529,055 | 7/1985 | Gotoh et al. | 180/210 |
| 4,541,501 | 9/1985 | Kawasaki | 180/215 |
| 4,555,121 | 11/1985 | Lockard et al. | 280/657 |
| 4,570,739 | 2/1986 | Kramer | 180/216 |
| 4,666,008 | 5/1987 | Shepard et al. | 180/16 |
| 4,750,578 | 6/1988 | Brandenfels | 180/13 |
| 4,892,166 | 1/1990 | Gaffney | 180/208 |
| 4,944,359 | 7/1990 | Doman et al. | 180/208 |
| 4,944,360 | 7/1990 | Sturges | 180/210 |
| 4,947,955 | 8/1990 | Hopely, Jr. | 180/216 |
| 4,991,810 | 2/1991 | Andrus et al. | 248/286 |
| 5,011,174 | 4/1991 | Ross-Clunis | 280/287 |
| 5,020,624 | 6/1991 | Nesterick et al. | 180/210 |
| 5,036,938 | 8/1991 | Blount et al. | 180/208 |
| 5,114,120 | 5/1992 | Bartelt et al. | 254/323 |
| 5,147,106 | 9/1992 | Bartelt et al. | 296/202 |
| 5,150,762 | 9/1992 | Stegeman et al. | 180/208 |
| 5,228,533 | 7/1993 | Mitchell | 180/208 |
| 5,230,405 | 7/1993 | Bartelt | 187/12 |
| 5,238,082 | 8/1993 | Stegeman et al. | 180/208 |
| 5,333,702 | 8/1994 | Gaffney et al. | 180/208 |

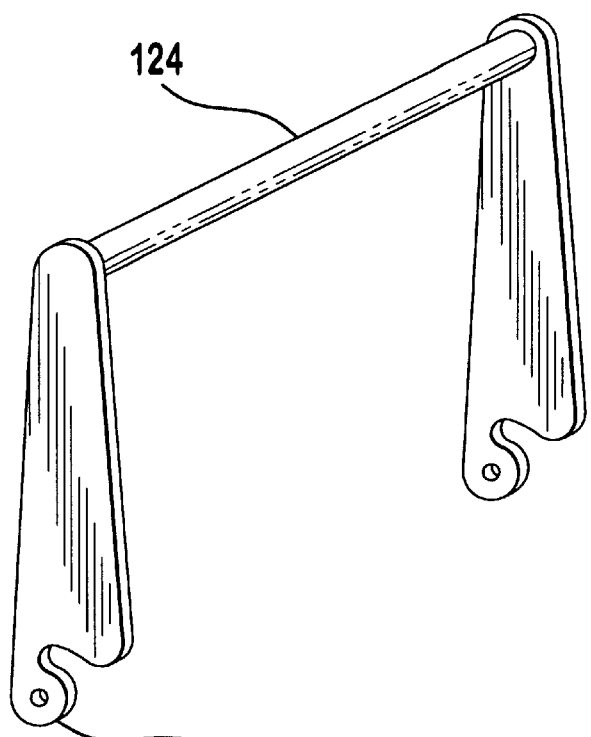
FIG. 21
FIG. 22
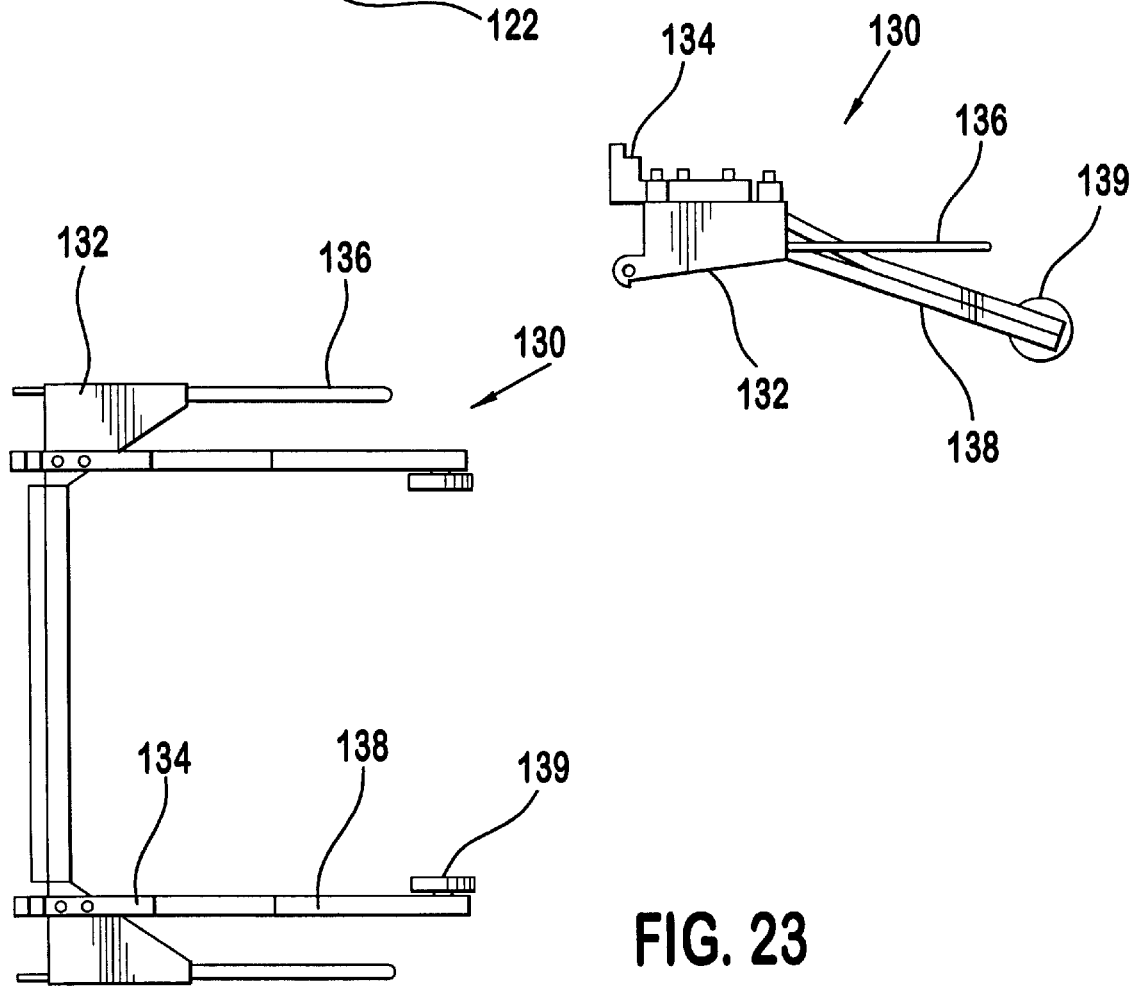
FIG. 23

PERSONAL MOBILITY VEHICLE

This application claims the benefit of U.S. Provisional Appication No. 60/045,144, filed Apr. 30, 1997.

BACKGROUND OF THE INVENTION

1. Field of the Invention

This invention is generally directed to powered personal mobility vehicles ("PMV") and more specifically to PMVs which can be readily assembled and disassembled for ease of transportation.

2. Description of the Prior Art

Individuals with disabilities have traditionally relied upon manually operated wheel chairs for personal mobility. However, for long distances, tight confines, or general convenience, the wheel chair presents problems for the physically challenged. To overcome some of the problems associated with manual wheel chairs, motorized wheel chairs were developed. However, motorized wheel chairs remain cumbersome with respect to transportation of the chair from location to location.

Motorized PMVs which can be assembled and reassembled were developed to overcome the shortcomings of the earlier vehicles. Such PMV's are generally referred to as breakdown or knockdown PMVs. However, prior art PMVs still present problems and inconveniences for users. For example, complicated tools or extreme manipulation of the components are often required for knockdown of the PMV by the user. This can be time consuming or even completely impossible for a physically challenged person, particularly when the person has limited use of a limb, such as is often the case for stroke victims. Many times the disassembly can result in a number of small component parts which may be easily damaged or misplaced. Finally some of the parts are either too heavy or too cumbersome to easily lift into a car or van for transportation by a single individual. Thus, it is desirable to have a PMV which can be easily disassembled, transported and reassembled for use, even with one hand.

Another problem associated with prior art PMVs is a lack of convenient and easy adjustment to provide the operator with a comfortable and safe operating position. This is again an even greater problem when the operator has impaired use of a limb, such as an arm. There remains a need for adjustable components and operating means which are easily accessible on either side of the PMV and provide a wide range of positions for comfort and safe operation.

SUMMARY OF THE INVENTION

The present invention includes a PMV having front and rear chassis which are releasably connected to one another via a locking means. The rear chassis includes alignment means for aligning the rear chassis with a suspension assembly of the front chassis. Once aligned, the front and rear chassis are locked together. An adjustable seat assembly supports a user while preventing accidental opening of the locking means.

BRIEF DESCRIPTION OF THE DRAWINGS

FIG. 21 is an isometric view of the chassis latch assembly.

FIG. 22 is a side elevation view of the intermediate assembly.

FIG. 23 is a top plan view of the intermediate assembly.

DESCRIPTION OF THE PREFERRED EMBODIMENT

Figure 1:
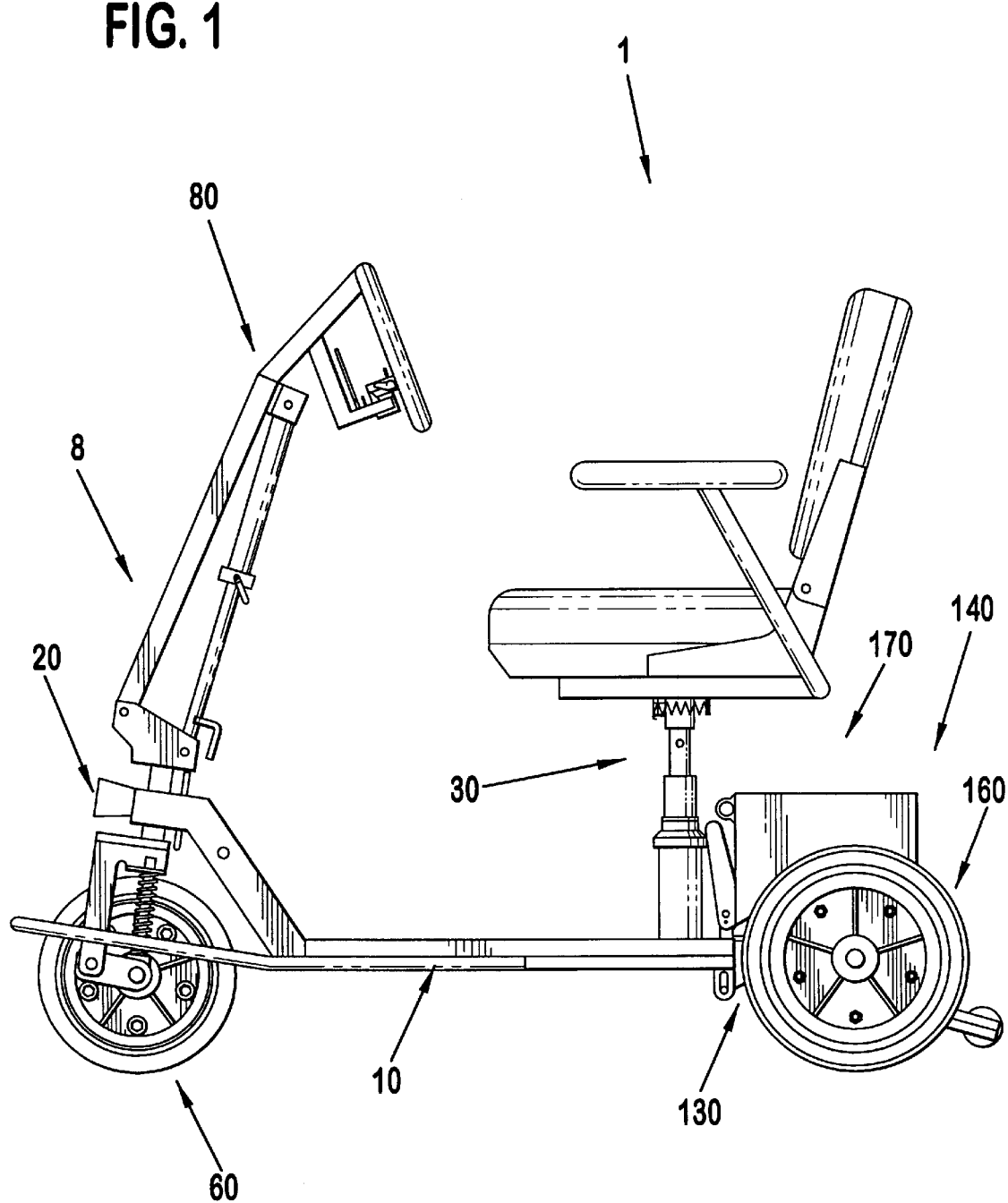
FIG. 1 is side elevation view of the PMV of the present invention.

The preferred embodiment will be described with reference to the drawing figures wherein like numerals represent like elements throughout.

FIG. 1 shows a PMV 1 made in accordance with the teachings of the present invention. The vehicle 1 generally comprises a front chassis 8 including a main frame 10, a seat assembly 30, a front wheel assembly 60, a steering assembly 80, and a head light 20; an intermediate assembly 130; and a rear chassis 140 including a rear drive unit 150 (not shown), a rear wheel assembly 160, and a battery housing 170.

Figure 2:
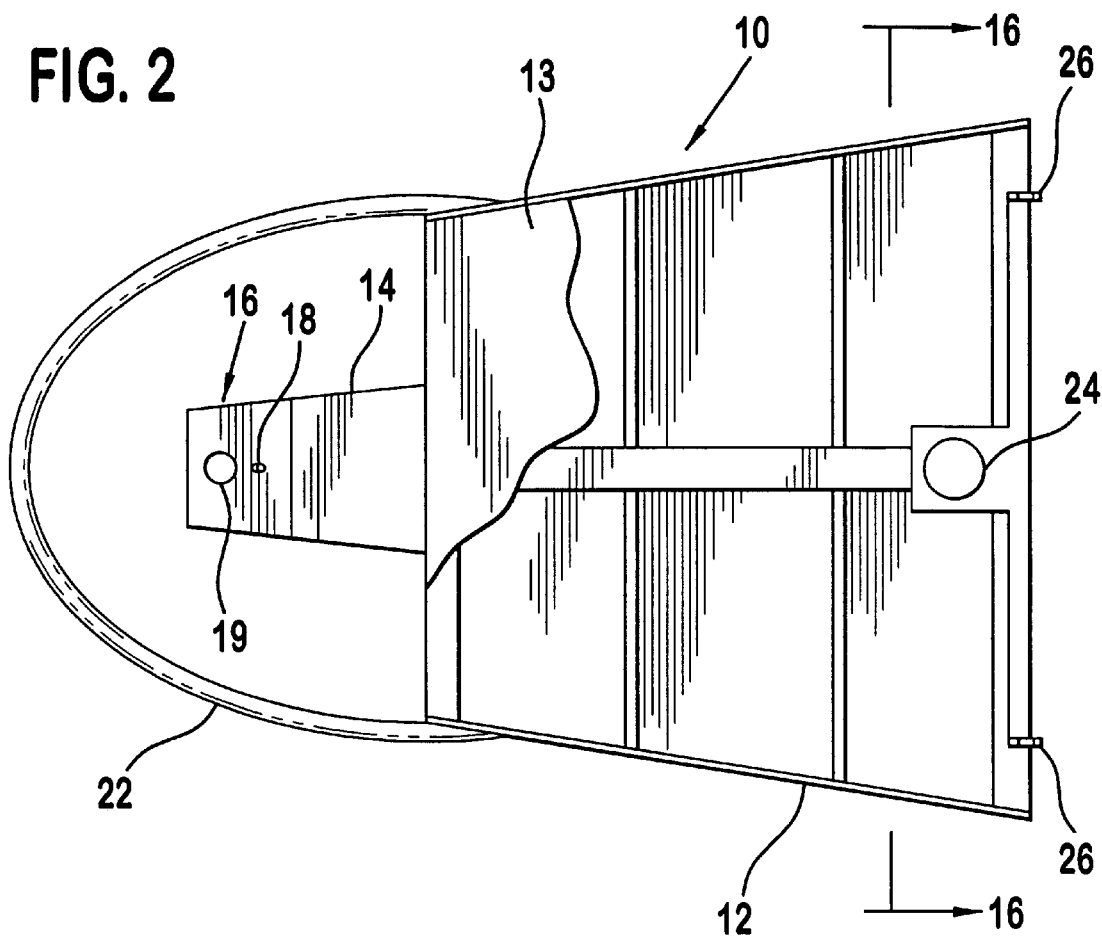
FIG. 2 is a top plan view of the main frame and front bumper.
Figure 3:
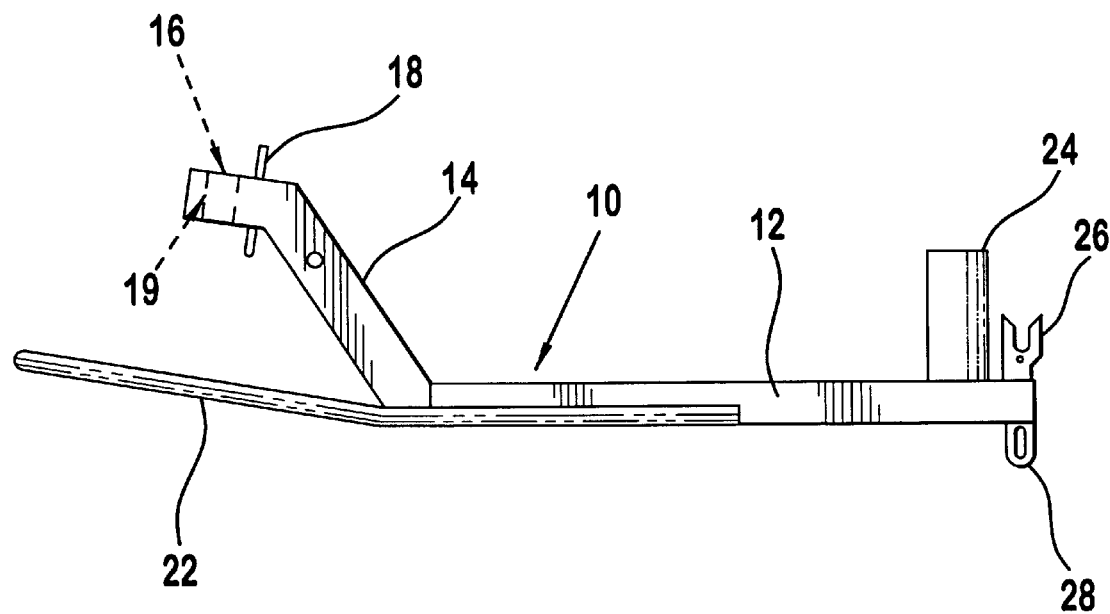
FIG. 3 is a side elevation view of the main frame and front bumper.
Figure 4:
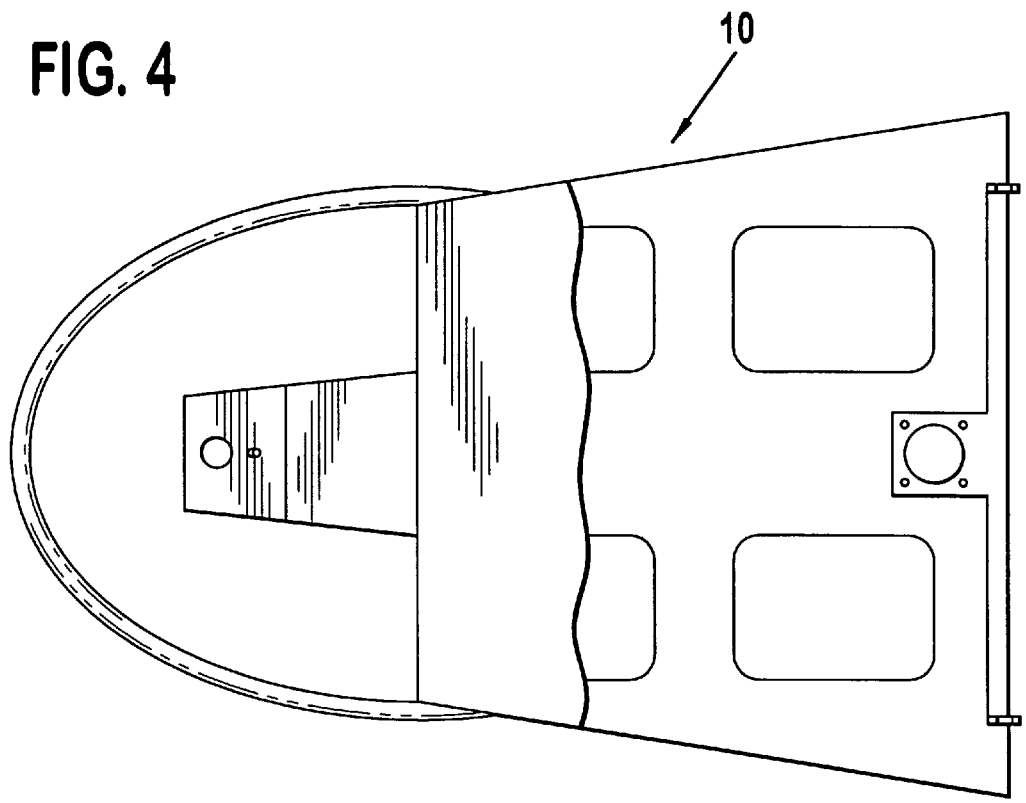
FIG. 4 is a top plan view of an alternate main frame and front bumpers.

Referring to FIGS. 1–3, the main frame 10 in the preferred embodiment is a skeletal structure consisting of steel tubes and flat bars. In an alternate embodiment shown in FIG. 4, the skeletal structure is made from welded sheet metal. It would be obvious to those skilled in the art to use any one of a number of materials, however, it is preferable that the material be both light weight and durable.

The main frame 10 generally consists of a floor platform 12, a frame neck 14, and a steering platform 16. The skeletal main frame 10 may be covered with a light weight material to form continuous surfaces 13, particularly on the floor platform 12. In the preferred embodiment, the surfaces are covered with a polycarbonate material such as lucite or acrylic. Paint may be applied to the surface material as desired. The paint is preferably applied to the inner surface which is attached to the main frame 10, whereby the paint is protected.

The steering platform 16 has an aperture 19 through which the steering assembly 80 is connected with the front wheel assembly 60. Also extending through the steering platform is a securing pin 18. The lower end of the securing pin 18 acts to prevent over rotation of wheel assembly 60. The function of the upper end of the securing pin 18 will be described in more detail later. A light assembly 20 may be attached to the front of the steering platform 16.

Figure 5:
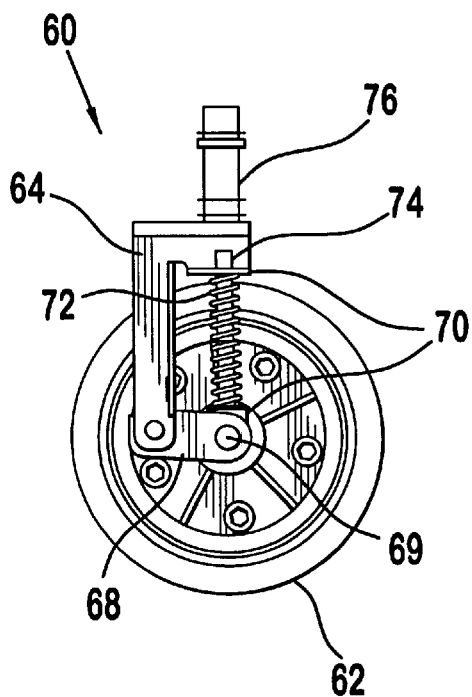
FIG. 5 is a side view of the front wheel assembly.
Figure 6:
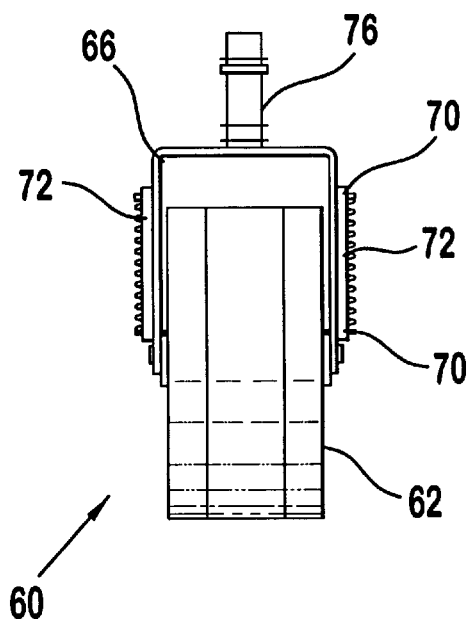
FIG. 6 is a front elevation view of the front wheel assembly.
Figure 7:
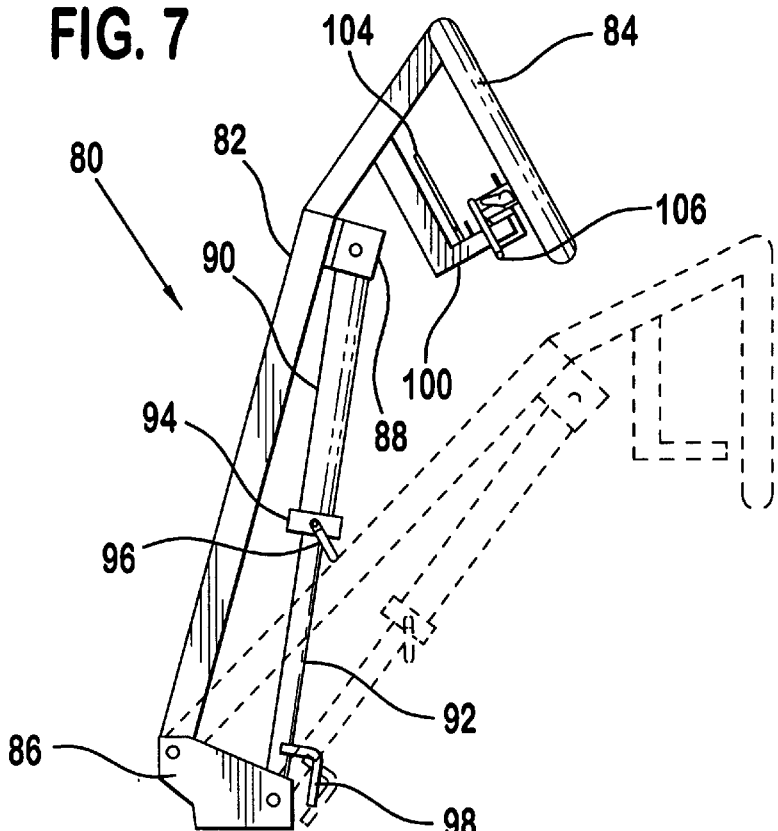
FIG. 7 is a side elevation view of the steering assembly.

The preferred front wheel assembly 60 is shown in FIGS. 5 and 6 and comprises a wheel neck 76 which at one end extends through the aperture 19 in the steering platform 16 and is connected at its other end to the front yolk 64. The yolk 64 is reinforced by a cross bar 66 and extends downward on each side of the front wheel 62. Each end of the yolk 64 is connected to a swing arm side 68. A bolt 69 passes through both swing arm sides 68 and the front wheel 62 to secure the front wheel 62 to the yolk 64. Each of the swing arm sides 68 and each side of the upper portion of the yolk 64 have suspension brackets 70. A suspension spring 72 is positioned between the bracket on each side of the wheel 62 and a spring shaft 74 is passed therethrough to hold the suspension springs 72 in place. The suspension springs 72 absorb shock to the front wheel assembly 60, which allows the front wheel 62 to be solid, rather than pneumatic. This is helpful to many users of this type of vehicle, as they sometimes have difficulty keeping pneumatic tires properly inflated. However, it is conceivable to use pneumatic tires, either with or without the suspension springs 72.

The wheel neck 76 passes through the steering platform 16 and is connected thereto. Necessary bushings are positioned above and below the steering platform 16 to provide a smooth and easily maneuverable front wheel assembly 60. While the preferred front wheel assembly 60 includes only one wheel 62, it would be obvious to those skilled in the art to make the PMV 1 with two front wheels.

The steering assembly 80 is shown in FIGS. 7–12 and includes a tiller mount 86 which is secured to the wheel neck 76. The tiller mount 86 has two pivot axes to which the main tiller post 82 and the inner tiller column 92 are pivotably connected. Inner tiller column 92 extends into outer tiller column 90 which is pivotably connected to a tiller lock bracket 88 attached to the main tiller post 82. A tiller lock collar 94 is attached to the opposite end of the outer tiller column 90. The tension of the lock collar 94 on the inner column 92 can be adjusted. When the lock collar 94 is tightened, it fixes the position of the outer and inner columns 90 and 92 relative to one another, thereby fixing the position of the steering assembly 80. When the lock collar 94 is loosened, the inner and outer columns 90 and 92 can be moved relative to one another, whereby the position of the steering assembly 80 can be adjusted, as shown in phantom in FIG. 7, over a complete range from an uppermost position to a collapsed position.

Figure 8:
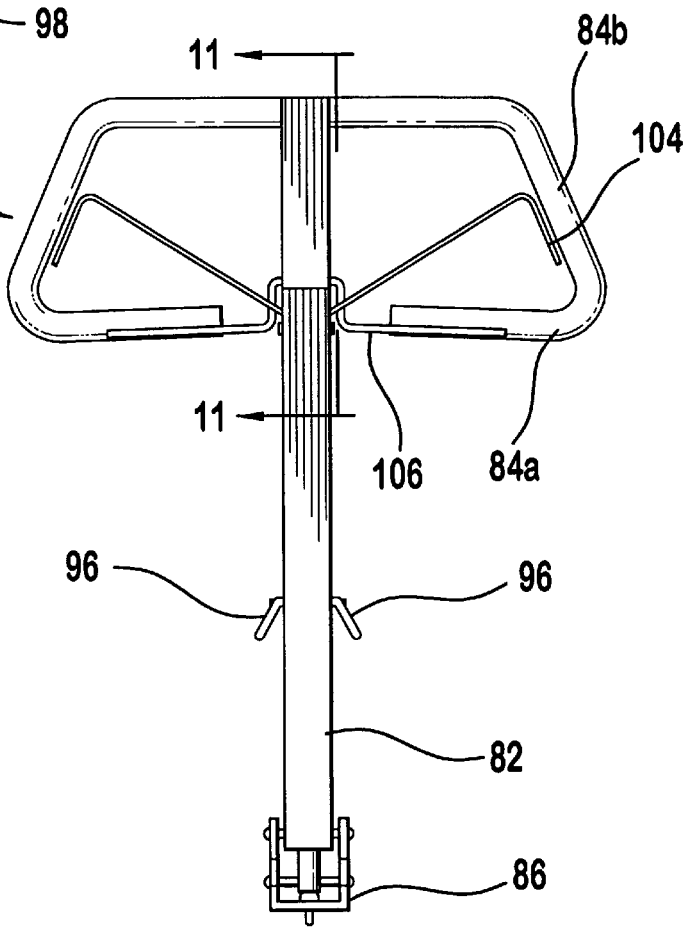
FIG. 8 is a front elevation view of the steering assembly.
Figure 9:
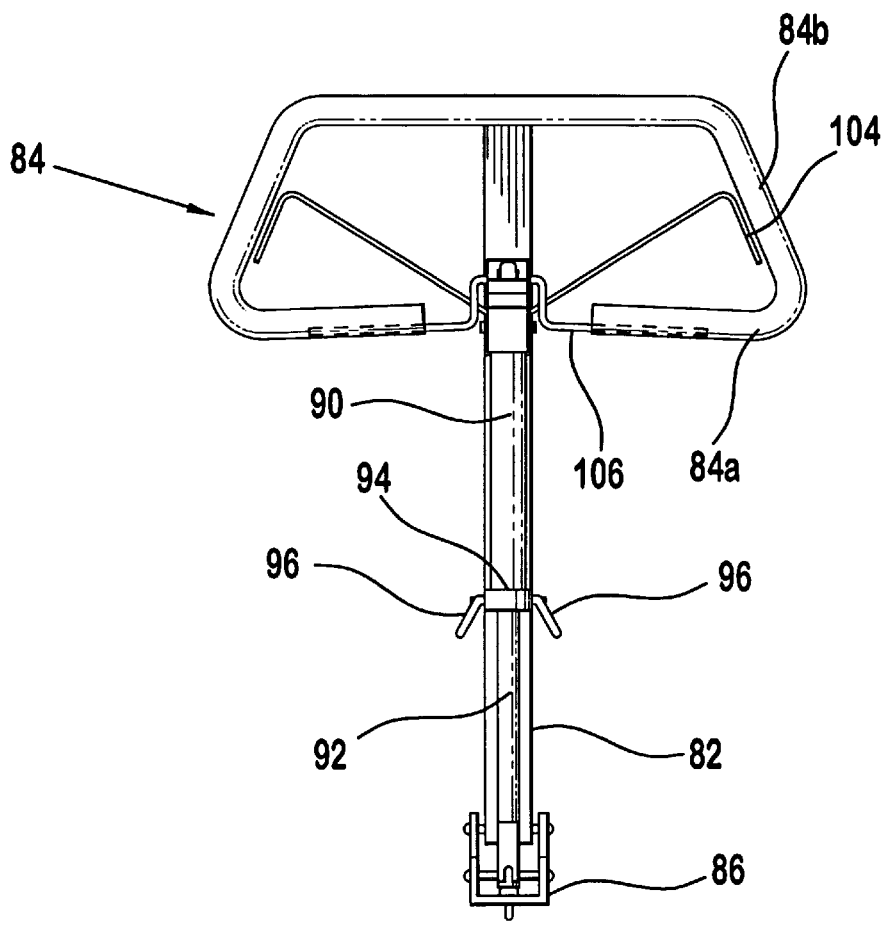
FIG. 9 is a rear elevation view of the steering assembly.

To adjust the tension in the lock collar 94, tiller lock handles 96 are preferably provided on opposite sides of the lock collar 94, as shown in FIGS. 8 and 9. Providing a tiller lock handle 96 on both sides of the steering assembly 80 allows a user to adjust the position of the steering assembly 30 with either hand. Alternatively, the handle 96 can be provided on only one side of the lock collar 94. The user can choose the configuration which suits the user's needs. Additionally, positioning the lock collar 94 and handles 96 at an approximately midway position along the steering assembly 80 makes them accessible to a seated user.

Figure 10:
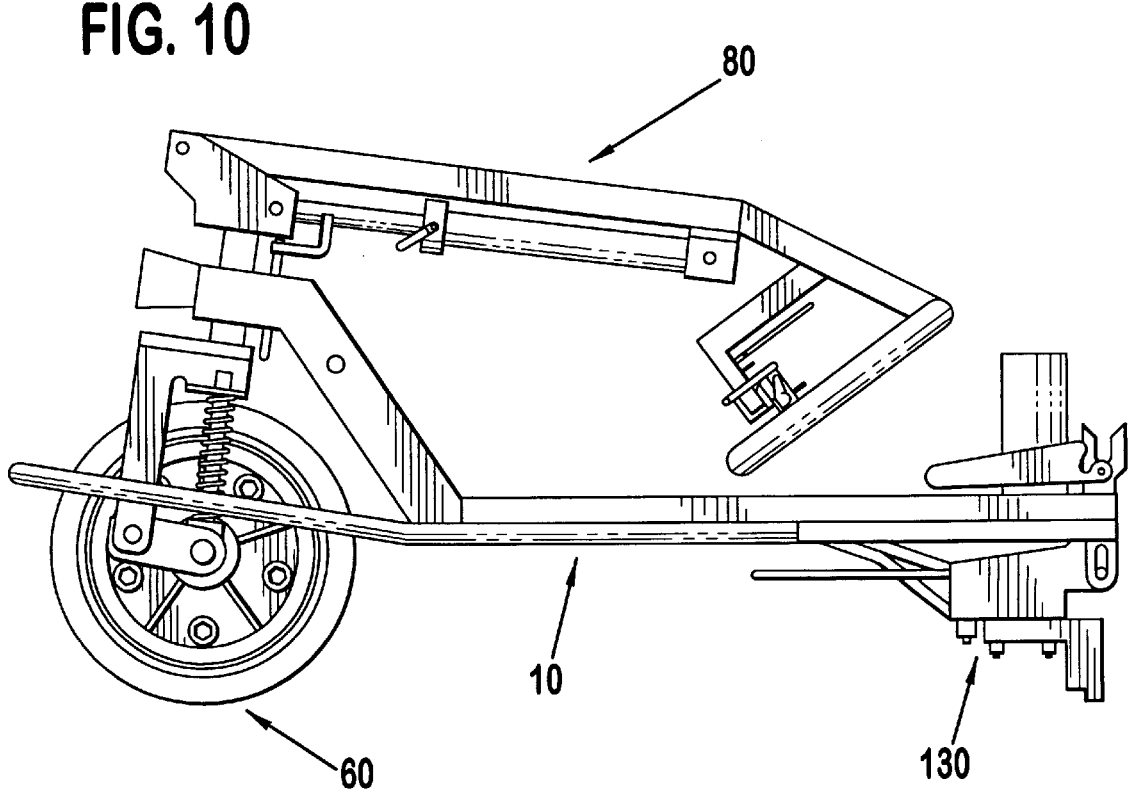
FIG. 10 is a side elevation view of the front chassis in a collapsed position.

Preferably, the inner tiller column 92 includes a tiller securing bracket 98 which engages the securing pin 18, see FIG. 3, when the steering assembly 80 is positioned in a collapsed, transport position as shown in FIG. 10. Engagement of the bracket 98 and the pin 18 prevents rotational movement of the steering assembly 80 and the front wheel assembly 60 during transportation.

The main tiller post 82 is joined with the handle bar 84. The handle bar 84 is preferably fixed relative to the tiller post 82, however, a joint may be provided which allows the handle bar 84 to be adjusted relative to the tiller post 82. The handle bar 84 is preferably angled relative to the tiller post 82 in a comfortable, ergonomic position. The handle bar preferably has the "delta" configuration shown in FIGS. 7 and 8. This configuration allows use with either hand and also allows the user to move his hand between a horizontal position along the lower portions 84a and a more vertical position along side portions 84b. Changing hand positions gives the user more dexterity, particularly on long trips.

Figure 11:
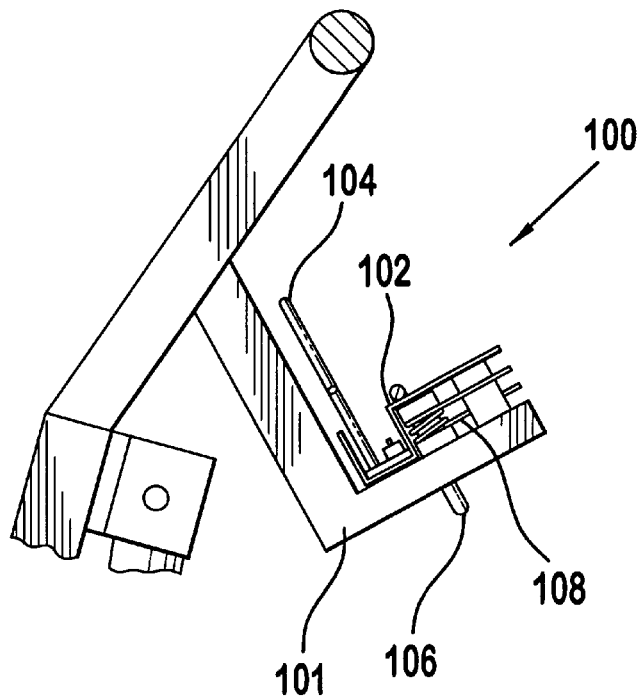
FIG. 11 is an exploded sectional view of the redundant control assembly taken along line 10—10 of FIG. 7.
Figure 12:
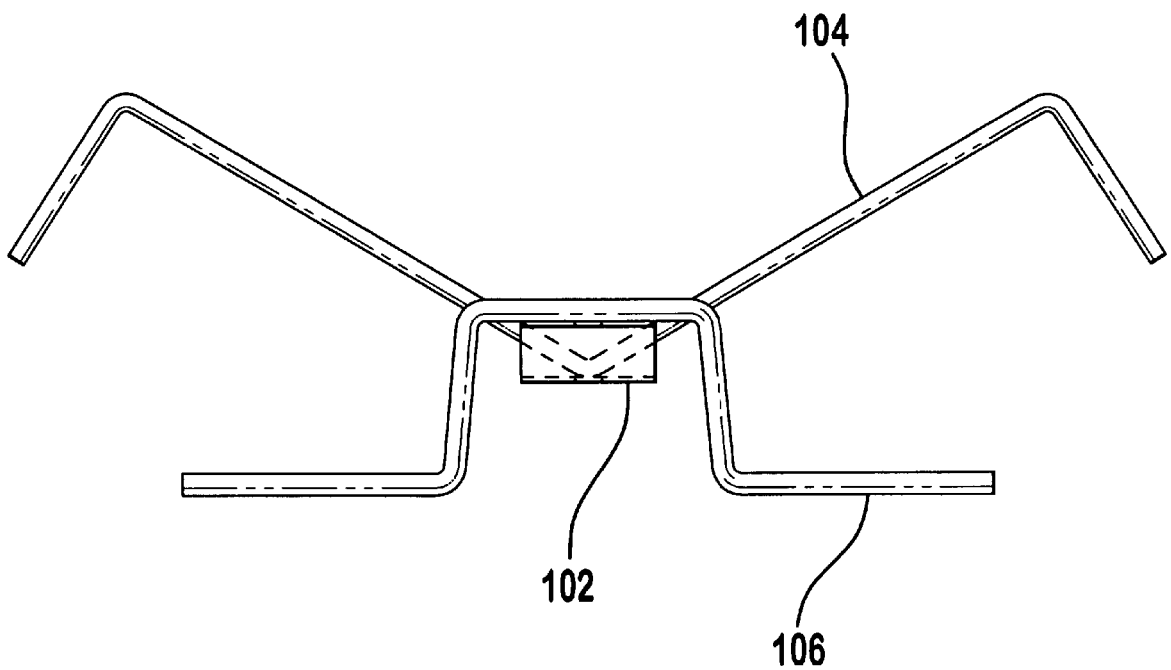
FIG. 12 is a front elevation view of the control rods.

Adjacent the handle bar 84 is the redundant control assembly 100 as shown in FIGS. 11 and 12. A camming receiver 102 is connected to the control bracket 101 which extends from the main tiller post 82. Upper and lower paddles 104 and 106, shown in FIG. 12, are connected to the camming receiver 102. When either paddle 104, 106 is rotated, an electrical signal is sent to the drive unit 150, through wiring not shown, which causes the PMV 1 to move either forward or backward. A return spring 108 extends from the camming receiver 102 to return the paddles 104, 106 to a central, neutral position when pressure is not applied. The control assembly 100 is preferably configured such that one side of the lower control 106 performs the opposite function from the same side of the upper control 104. That is, if movement of the right portion of the lower control 106 causes the PMV 1 to move forward, then movement of the right portion of the upper control 104 causes the PMV 1 to move backward. In this configuration, a rider has access to both forward and backward movement with only one hand. This again is of particular importance to users with the ability to use only one hand.

Figure 13:
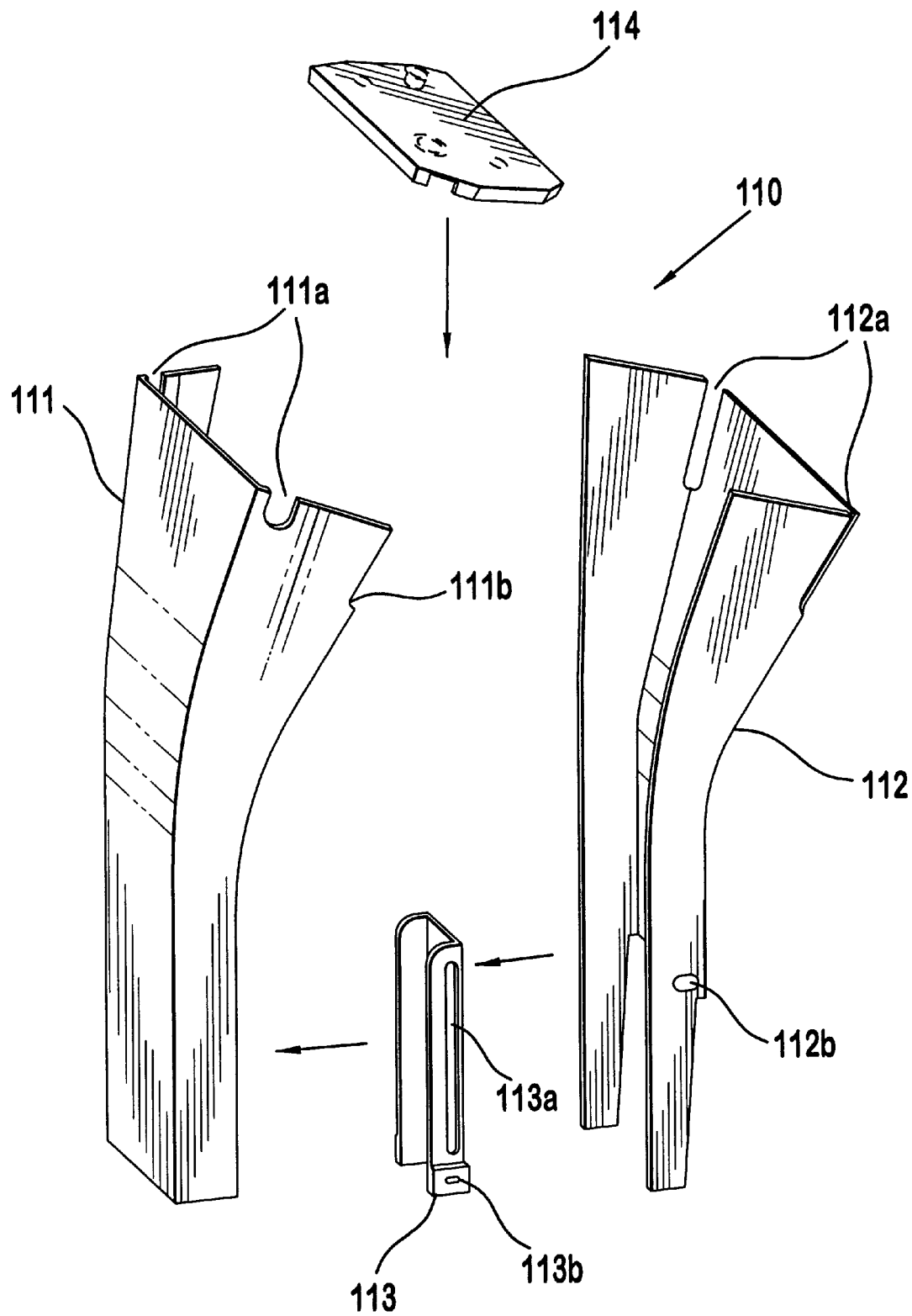
FIG. 13 is an isometric view of the preferred steering assembly cover.
Figure 14:
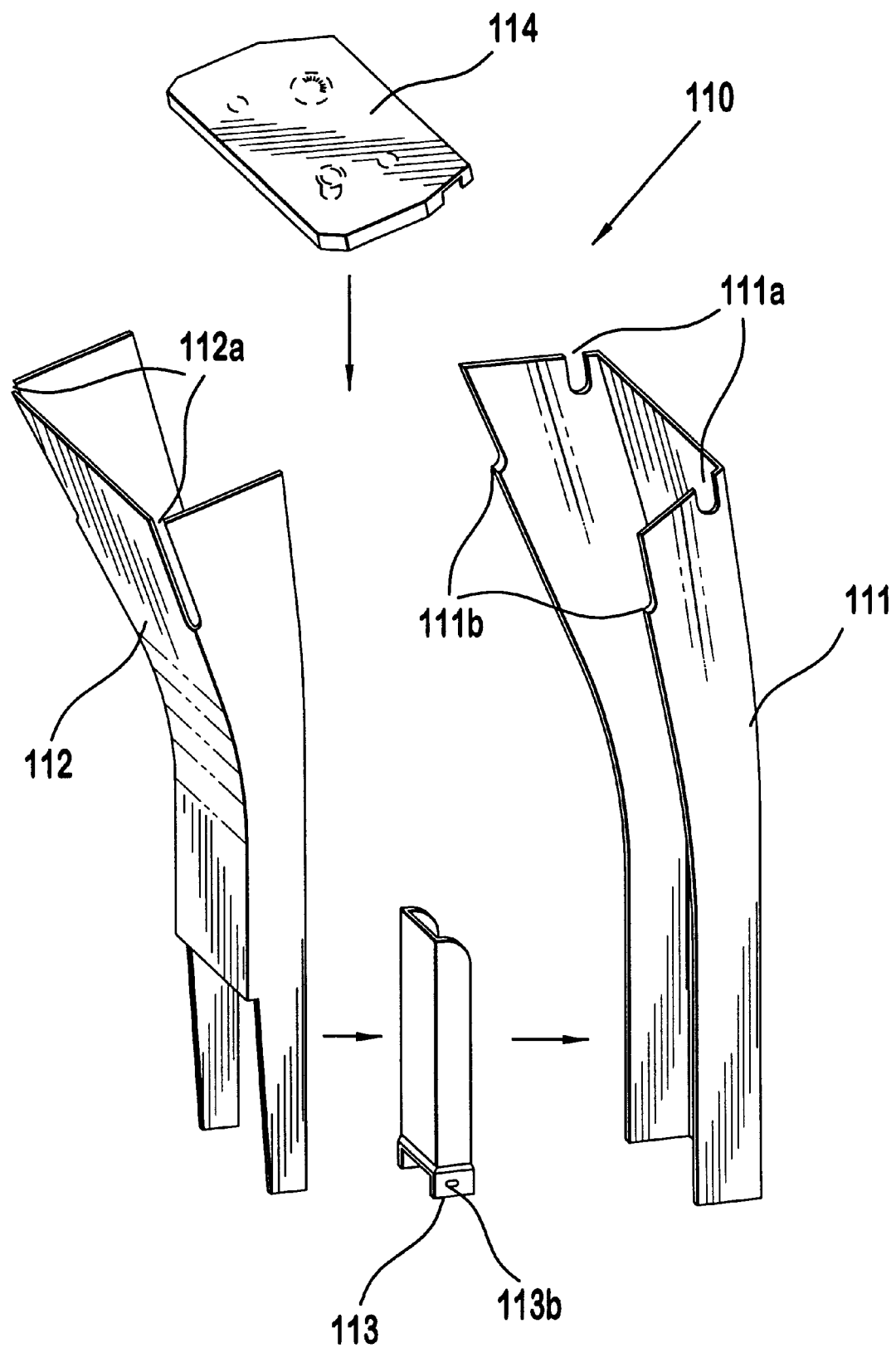
FIG. 14 is a second isometric view of the preferred steering assembly cover.
Figure 15:
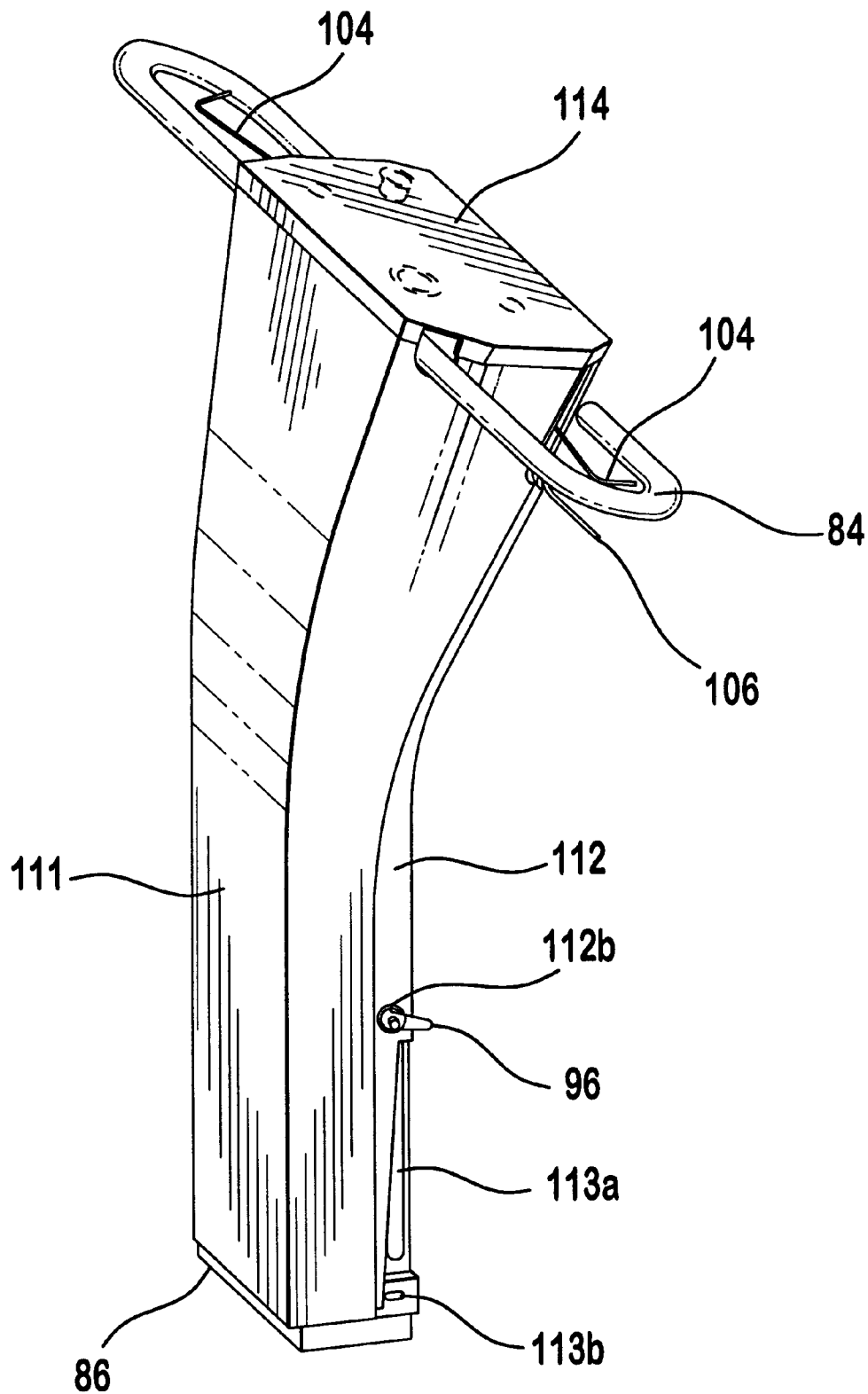
FIG. 15 is an isometric view of the preferred steering assembly cover positioned on the steering assembly.

The preferred steering assembly cover 110 is shown in FIGS. 13–15. The steering assembly cover 110 generally comprises front, rear, and top members 111, 112, 114 and a telescoping member 113. The front member 111 is positioned on the front of the steering assembly 80 and has notches 111a, 111b, which allow the handle bar 84 and the upper and lower paddles 104 and 106 to extend therethrough. The rear member 112 covers the rear of the steering assembly 80 and has upper notches 112a which allow the upper and lower paddles 104 and 106 to pass through. The rear member 112 also has at least one aperture 112b which allows the tiller lock handle 96 to extend therethrough. The number of apertures 112b will correspond to the number of tiller lock handles 96. The top member 114 connects the upper edges of front and rear members 114 and preferably houses the ignition switch and other instrumentation. The front, rear, and top members 111, 112 and 114 are generally fixed relative to one another. The telescoping member 113 is positioned between the front and rear members 111 and 112. The telescoping member has a slot 113a on at least one side thereof and aperture 113b on each side. One of the tiller pivot pins extends through the apertures 113b to hold the lower end of the telescoping member 113 in position and the tiller lock handle 96 extends through the slot 113a. The number of slots will correspond to the number of lock handles 96. The elongated slot 113a allows the telescoping member 113 to move relative to the lock handle 96 as the steering assembly 80 is rotated. The telescoping member 113 allows the steering assembly cover 110 to cover all of the moving components of the steering assembly 80, even while the steering assembly 80 is adjusted. This reduces the risk that objects can get pinched by the moving tiller members.

The main frame 10 also has a front bumper 22 extending forward therefrom. In the preferred embodiment, as shown in FIG. 1, the front bumper 22 extends beyond the most forward point of the wheel assembly 60, and the front wheel 62 is within the perimeter of the front bumper 22. Thus, bumper 22 protects front wheel 62 throughout its full range of motion.

Figure 16:
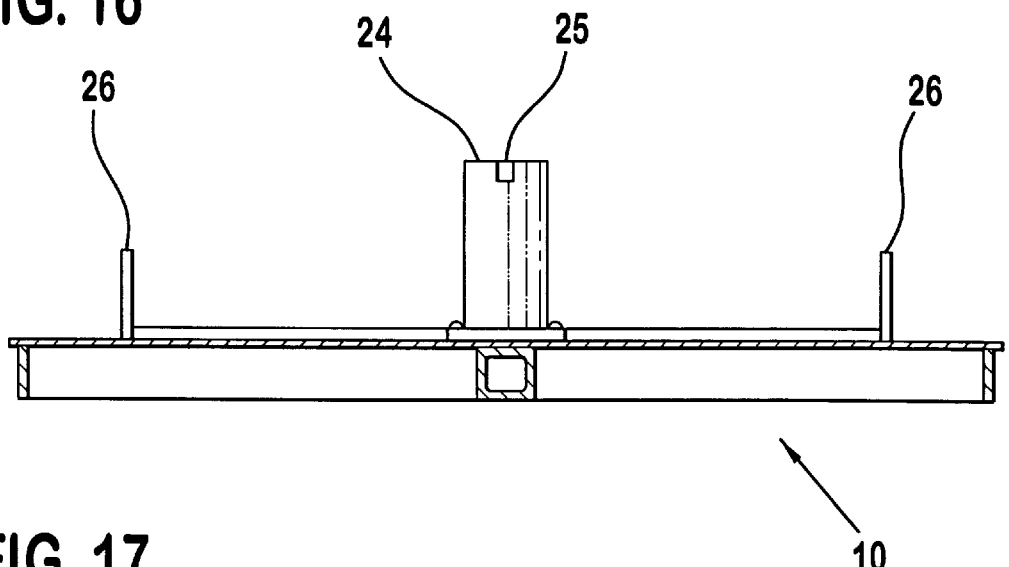
FIG. 16 is a cross sectional view of the main frame taken along the line 16—16 in FIG. 3.
Figure 17:
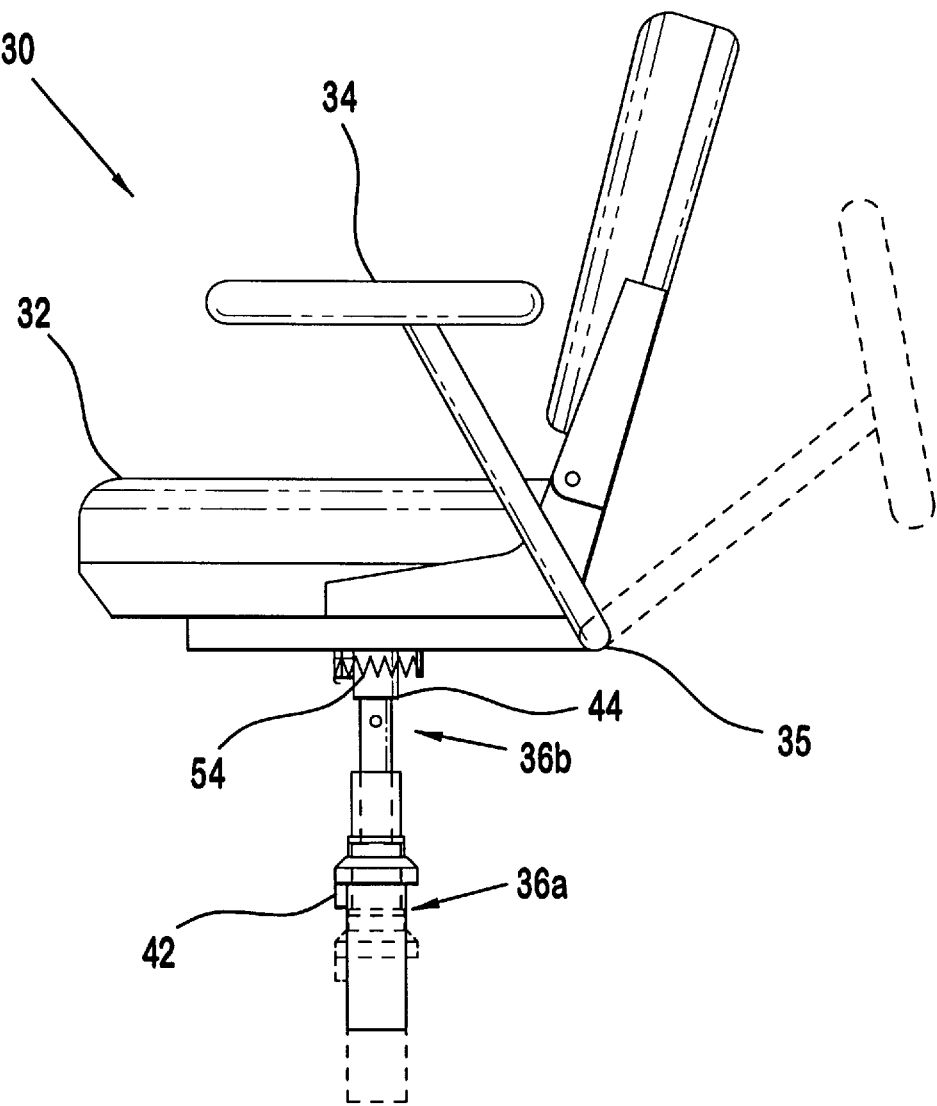
FIG. 17 is a side elevation view of the seat assembly.
Figure 18:
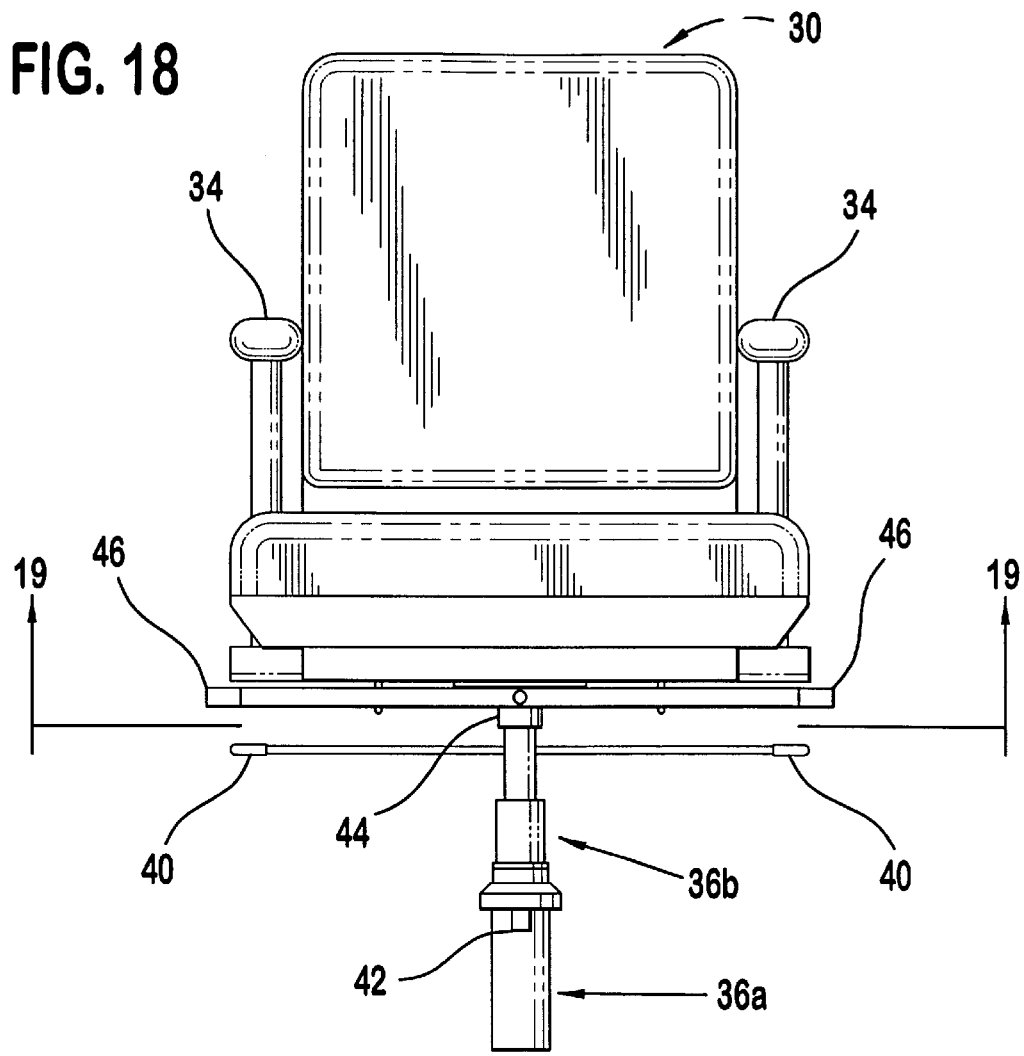
FIG. 18 is a front elevation view of the seat assembly.
Figure 19:
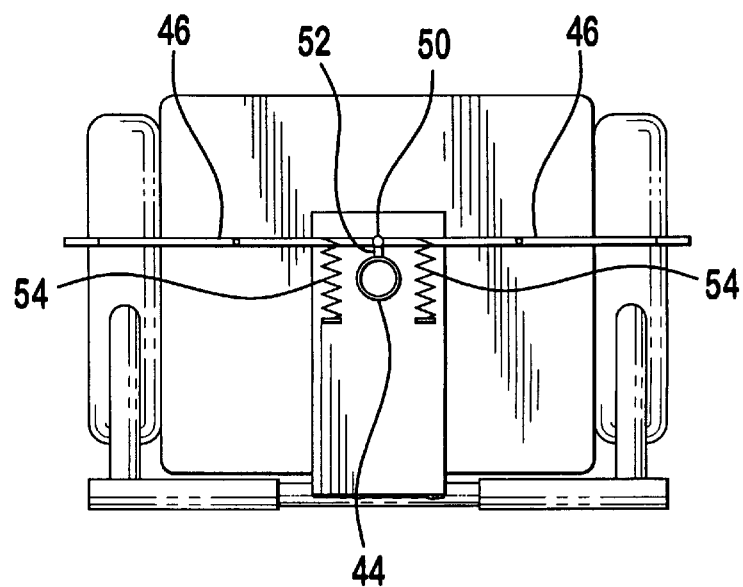
FIG. 19 is an underside view of the seat assembly taken along the line 19—19 in FIG. 18.
Figure 20:
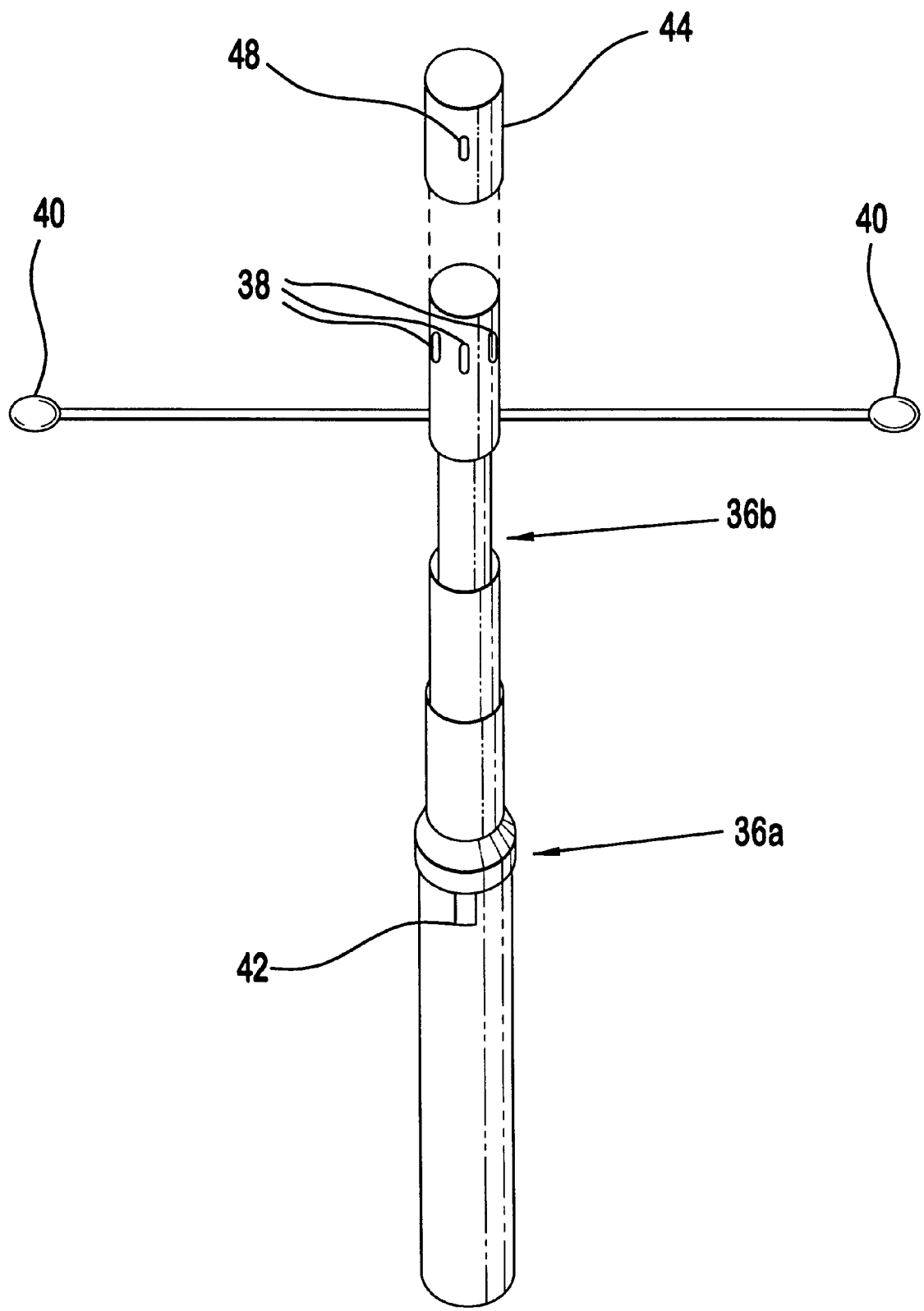
FIG. 20 is an isometric view of the seat post and the seat connector.

Seat post support 24 is connected to and extends from the floor platform 12 of the front chassis 8. A separable seat post 36 has a base 36a and an upper shaft 36b. The base 36a is dimensioned to slide securely into the seat post support 24. The seat post base 36a includes a seat post lock 42 which aligns with the notch 25 in the post support 24 shown in FIG. 16. The engagement between the seat post lock 42 and the notch 25 prevents rotational movement of the seat post 36 and the secure interconnection between the seat post base 36a and the support 24 provides a stable support for the seat assembly 30. Since seat post 36 does not utilize any additional locking means, it can be removed from the seat post support 24 by a simple vertical lifting motion. As shown in FIG. 20, the upper end of the upper shaft 36b preferably has slots 38 at approximately 90° intervals around its circumference.

The seat assembly 30, shown in FIGS. 17–20, further comprises a cushioned seat 32 that connects to the seat post 36. The seat 32 is preferably hinged to allow the upper seat member to be folded against the lower seat member for compactness when the unit is transported.

A seat connector 44 extends from the underside of the seat 32. The preferred configuration of the seat connector 44 is shown in FIG. 20. The seat connector 44 has a connector slot 48 and is configured to slidably mount on the seat post upper shaft 36b, whereby the connector slot 48 can be aligned with the post slots 38. This configuration allows the seat 32 to rotate from a position which faces forward, to a position facing either side. When the seat 32 is facing forward, a pin 52 extends through the connector slot 48 and into one of the post slots 38, thereby locking the seat 32 to the post 36. In the preferred embodiment, a swivel arm 46 extends from each side of the seat and is attached to the pin 52 and a pivot point 50. A spring 54 is attached to each arm 46 to maintain the pin 52 in the locked position. When the user wants to swivel the seat 32, either arm 46 may be pivoted to release the pin 52 from the post slot 38. The seat 32 can be freely rotated in either direction until the pin 52 is aligned with one of the other post slots 38, at which time the springs 54 urge the pin 52 into the slot 38. Swivel arms 46 extending from both sides of the seat 32 allow a user to swivel the seat 32 with either hand. To remove the seat 32 from the post 36, the seat 32 is swiveled so the pin 52 is not aligned with any of the post slots 38, whereby the seat 32 can be lifted off the post 36.

The seat 32 also has a detachable, pivotable arm rest 34 extending on each side thereof. Each armrest 34 can be pivoted about its pivot axis 35 to an open position as shown in phantom in FIG. 17. Since each arm 34 can be pivoted, the user can enter and exit the vehicle from either side. This may be of particular importance to a user who favors one side of the body over the other.

The height of the seat 32 is also adjustable to provide greater safety and comfort. The upper shaft 36b and seat post base 36a contain a fluid actuated adjustment mechanism which allows seat 32 to be raised and lowered. The preferred seat post 36 is a Fixlift™ non-swivel column manufactured by Suspa Incorporated, Grand Rapids, Mich. The user moves the seat 32 to a desired height by pulling up on either height adjustment arm 40. Again, a height adjustment arm extends from each side of the seat 32 to allow adjustment by either hand.

Alternatively, a seat assembly may be designed specifically for either left-hand or right-hand use, whereby both the swivel arm 46 and height adjustment arm 40 extend from a desired side of the seat 32. A user would select a PMV 1 having right or left-hand operation depending on the user's needs.

Attached to the floor platform 12, preferably rear of the seat post support 24, are front chassis latch brackets 26 and front chassis hinges 28. As shown in FIG. 21, attached to each of the front chassis latch brackets 26 is a chassis latch 122, with a chassis latch handle 124 extending between the two chassis latches 122. Each bracket 26 and each latch 122 has a notch for receiving and retaining a locking bar 176 which locks the front chassis 8 with the rear chassis 140. Interconnection of the chassis will be described in greater detail hereinafter.

The intermediate assembly 130, shown in FIGS. 22 and 23, is connected to the front chassis 8 via the interconnection of the intermediate assembly hinge 132 and the front chassis hinge 28. Chassis latch rear bracket blocks 134 are connected to the front of the intermediate assembly 130 and are aligned with the front chassis hinges 28. The blocks 134 provide stability to the locking bar 176 when the front and rear chassis 8 and 140 are connected and assist in alignment of the chassis 8 and 140.

Figure 24:
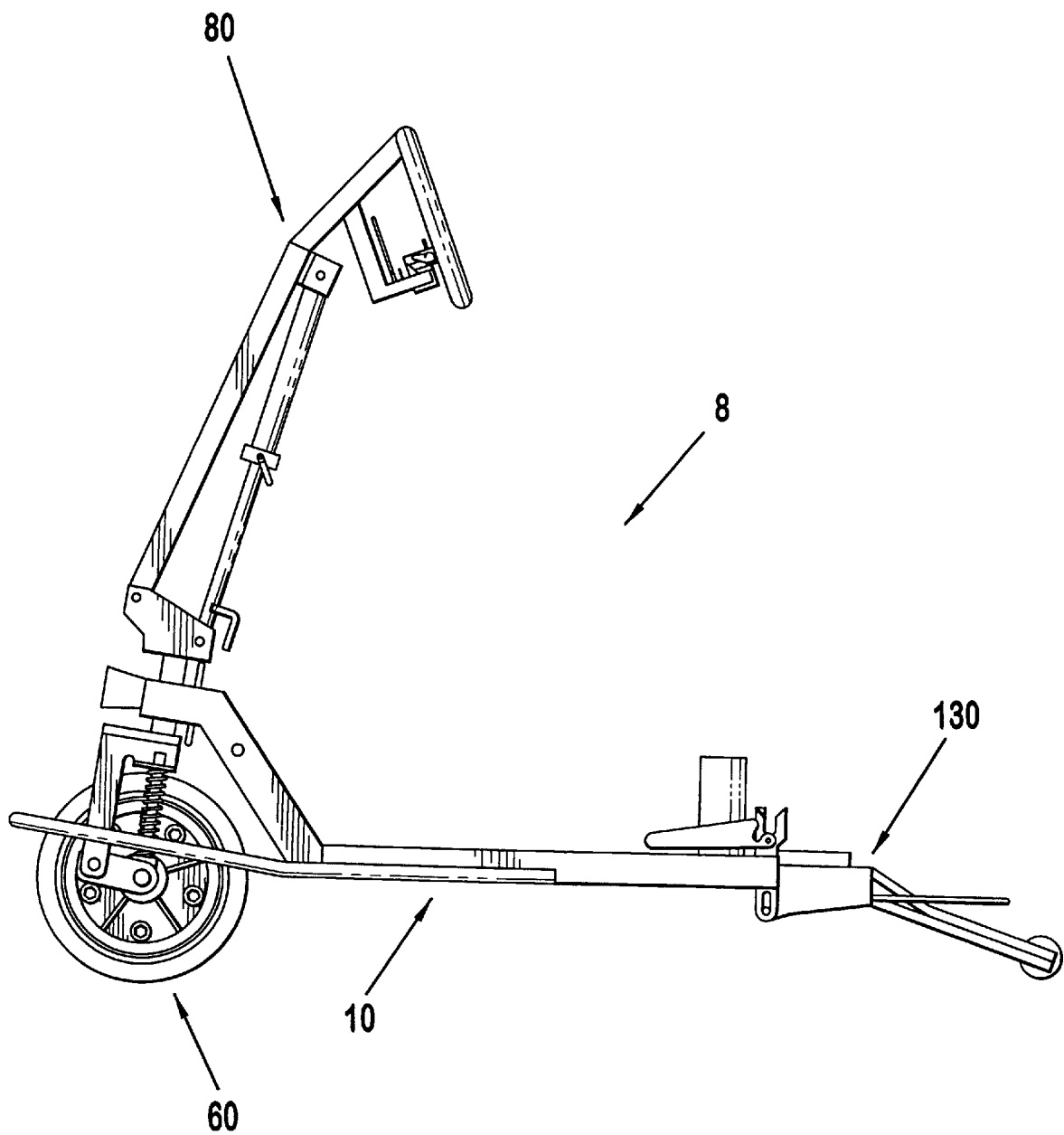
FIG. 24 is a side elevation view of the front chassis.

As shown in FIG. 24, wheelie bars 138 extend rearward from each side of the intermediate assembly 130. A secondary rear wheel 139 is attached to each of the wheelie bars 138. The wheelie bars 130 are angled such that the intermediate assembly 130 supports the rear end of the front chassis 8 when the rear chassis 140 is not attached. In this configuration, the secondary rear wheels 139 are in contact with the road surface and allow the front chassis 8 to be easily maneuvered when the PMV 1 is disassembled.

Leaf springs 136 extend rearwardly from each side of the intermediate assembly 130. The leaf springs 136 provide a shock absorbent suspension to the rear wheel assembly 160 and an alignment feature for the rear chassis 140. This allows the rear tires 162 to be solid. The alignment function of the leaf springs 136 will be described hereinafter.

A spring unit (not shown) is connected between the underside of the floor platform 12 and the intermediate assembly 130. When the PMV 1 is disassembled and the front chassis 8 is lifted to be placed in a vehicle for transportation, the spring unit retracts the intermediate assembly 130 against the undersigned of the floor platform 12 for easy, compact storage and transportation.

Figure 25:
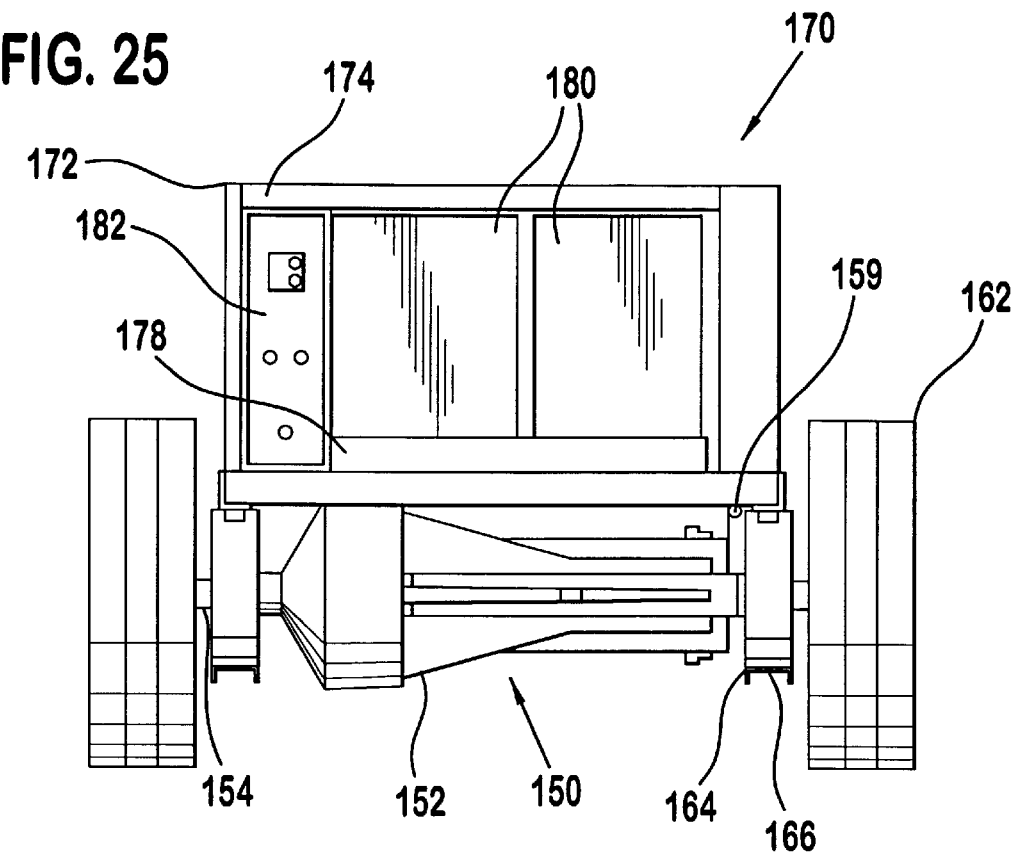
FIG. 25 is a rear elevation view of the rear chassis.
Figure 26:
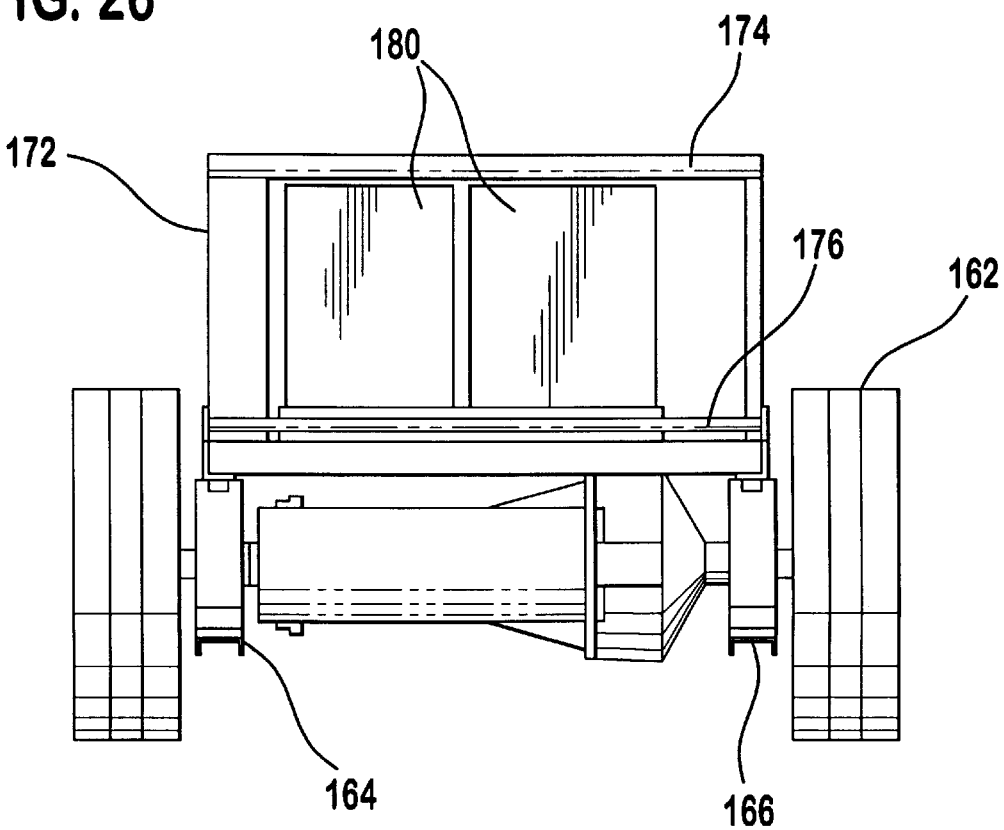
FIG. 26 is a front elevation view of the rear chassis.
Figure 27:
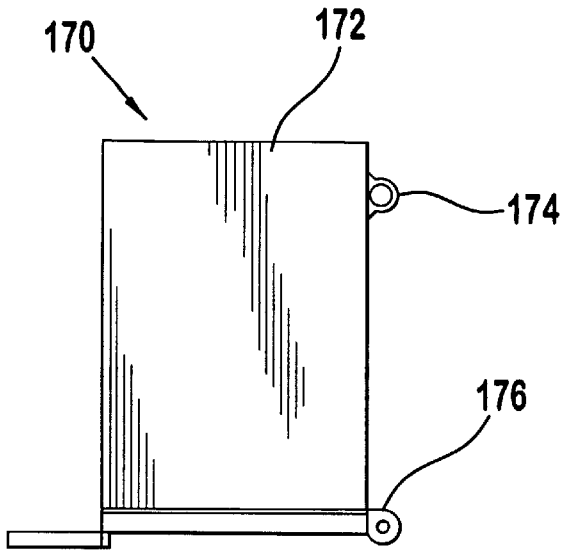
FIG. 27 is a side elevation view of the battery housing.

The rear chassis 140, shown in FIGS. 25–27, generally comprises the rear drive unit 150, the rear wheel assembly 160, the battery housing 170 and the rear wheel brake release 180. The rear wheels 162 are connected to a rear axle 154 which is driven by the motor 152. The rear wheels 162 are preferably slowed by the internal braking power of the motor 154 and generally lock when the motor 154 is not powered. The rear wheel brake release 159 can be switched to disengage this braking power. This allows the rear wheels 162 to rotate and the rear chassis 140 to be maneuvered during assembly and disassembly.

The axle 154 passes through an alignment bracket 164 at each end of the motor 152. Each alignment bracket 164 has a channel passing through it which is dimensioned to receive one of the leaf springs 136 and an alignment bar 166 extending across the channel.

The battery housing 170 is attached to the alignment brackets 164 and has a frame 172 which is preferably made from sheet metal. A battery pan 178 is positioned in the frame 172 to hold the batteries 180. A rear handle 174 extends between the sides of the frame 172 and provides a means for controlling movement of the rear chassis 140 during assembly and disassembly. The frame 172 has additional compartments formed therein for housing other electrical components. Preferably, a majority of the electric components are housed in a single box 182 which slides into the frame 172. A locking bar 176 also extends between the sides of the frame 172 and is dimensioned to fit securely in the notches of the front chassis latch bracket 26 and the chassis latch 122 when the PMV 1 is assembled.

Having described the components of the PMV 1, assembly and disassembly of the PMV 1 will now be described.

FIG. 10 shows the front chassis 8 with the steering assembly 80 in the collapsed position and the intermediate assembly 130 in the retracted position. To assemble the PMV 1, the back end of the floor platform 12 is lifted and the intermediate assembly is rotated to the position shown in FIG. 24. The spring unit which retains the intermediate assembly 130 under the floor platform 12 during transportation is tensioned such that the weight of the PMV 1 prevents the intermediate assembly 130 from retracting back under the front chassis 8 after it has been set down. The steering assembly 80 is raised to a desired position, and the tiller lock handle 96 is turned to secure the steering assembly 80 in position.

The rear chassis 140 is then connected to the front chassis 8. The rear brake release 180 is switched to release the rear wheels 162 and the rear chassis 140 is maneuvered, by holding the rear handle 174, to a position behind the front chassis 8 where the alignment brackets 164 are aligned with the leaf springs 136. The rear chassis 140 is rotated backward to a position where the support bars 166 are in a lower position. As the rear chassis 140 is wheeled forward, the leaf springs 136 pass into the alignment brackets 164 and above the lowered support bars 166. The rear chassis 140 is moved forward, and rotated, as necessary, until the locking bar 176 is positioned in the notches of the front chassis latch brackets 26 and supported by the rear bracket blocks 134. During rotation of the rear chassis 140 into position, a camming action simultaneously causes the support bars 166 to engage the leaf springs 136 and lift the intermediate assembly 130. As a result, the wheelie bars 138 and secondary rear wheels 139 are positioned slightly above the ground and behind the rear wheels 162, as shown in FIG. 1. In this position, the wheelie bars 138 and secondary rear wheels 139 act as a safety support in the event that the PMV 1 tips backward.

Figure 28:
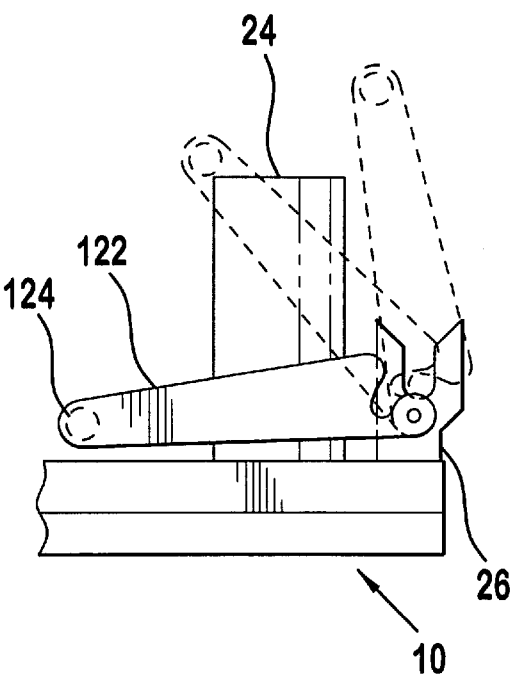
FIG. 28 is a side elevation view of the chassis latch moving relative to the seat support.
Figure 29:
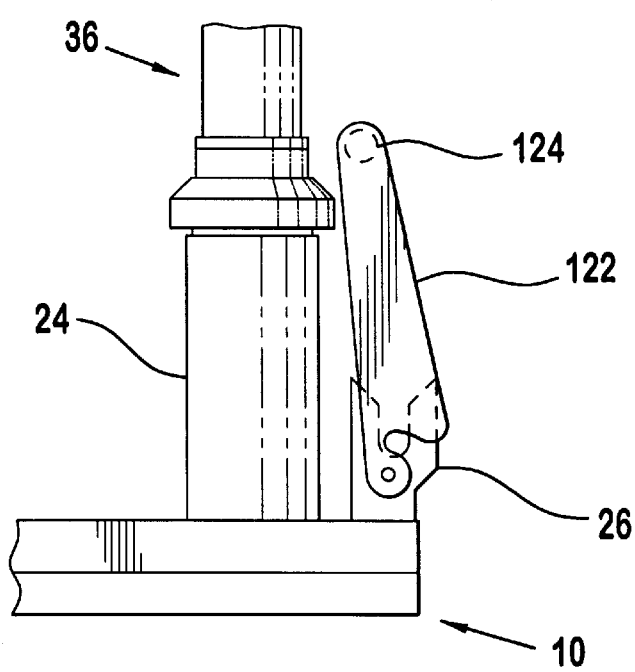
FIG. 29 is a side elevation view of the chassis latch in a locked position.

With the locking bar 176 positioned in the front chassis latch brackets 26, the chassis latches 122 are rotated upward by the latch handle 124 as shown in FIG. 28. When the chassis latches 122 reach a substantially vertical position, as shown in FIGS. 1 and 29, the locking bar 176 is securely held between the chassis latches 122 and the front chassis latch brackets 126. The seat post 36 is then put into the seat post support 24, with the seat post lock 42 engaging the seat post support notch 25. The seat 32 is then mounted and locked on the post 36. As can be seen in FIG. 29, the seat post 36 prevents the latch handle 124, and thereby the rear chassis latches 122, from rotating forward to an unlocked position. This feature provides additional assurance that the front and rear chassis 8 and 140 will not inadvertently separate. Additionally, if the seat post 36 is put in place before the latches 122 are rotated to the locked position, the weight of the seat post 36, if not alone then in conjunction with the weight of the seat 32, will provide a sufficient force to cause the locking bar 176 to disengage from the latch brackets 126. As a result, the rear chassis 140 rotates rearward and disconnects the wiring between the front and rear chassis 8 and 140, thereby making the PMV 1 inoperable. Since it is the weight of the seat assembly 30 that causes disconnection, a user who inadvertently fails to properly lock the latches 122 will become aware of the problem before sitting on the PMV 1.

To disassemble the PMV 1 for storage or transportation, the above steps are repeated in the reverse order. As shown in FIG. 10, when the steering assembly 80 is placed in the collapsed position, the tiller securing bracket 98 engages the securing pin 18, thereby preventing unwanted rotation of the steering assembly 80 or the front wheel assembly 60.

While the present invention has been described in terms of the preferred embodiment, other variations which are within the scope of the invention as outlined in the claims will be apparent to those skilled in the art.

We claim:

1. An improved removable seat assembly for a personal mobility vehicle of a type having a seat support that mates with the seat assembly, the improvement characterized by:

the seat assembly having an adjustable seat post and a seat which are detachable from each other to form subassemblies of the seat assembly, the seat post including a fluid actuated adjustment mechanism that is adjustable through a range of height positions.

2. The improved seat assembly of claim 1 wherein the seat is rotatable relative to the seat post.

3. An improved seat assembly for a personal mobility vehicle of a type having a seat support that mates with the seat assembly, the seat assembly having a seat post and a seat which are detachable from each other to form subassemblies of the seat assembly, the seat assembly characterized by:

the seat post including a seat post base which mates with the seat support and an upper shaft having an end connected to the seat post base and a free end having a slot therein;

the seat including a seat connector which has a slot therein and mounts on the upper shaft free end; and a keeper means for fixing the seat post and seat together, whereby the seat is maintained in connection with the seat post by extending the keeper means through the upper shaft and seat connector slots.

4. The improved seat assembly of claim 3 further comprising a fluid actuated adjustment mechanism for adjusting the seat post base and the upper shaft relative to one another.

5. The improved seat assembly of claim 3 wherein the upper shaft has a plurality of slots and the seat can be rotated relative to the post by removing the keeper means from the upper shaft slot, aligning the connector slot with a different upper shaft slot, and reinserting the keeper means.

6. An improved seat post for a personal mobility vehicle, the improvement characterized by:

the seat post having a first end which has means for removably mounting the seat post on the personal mobility vehicle; and a second end which has means for mating with and securing a seat member to the seat post.

* * * * *